United States Patent [19]

Church

[11] Patent Number: 4,685,337

[45] Date of Patent: Aug. 11, 1987

[54] STRESS GAUGING DEVICE FOR THREADED CONNECTOR

[76] Inventor: Kristy L. Church, Box 72A, Rte. 3, Montgomery, Tex. 77356

[21] Appl. No.: 833,428

[22] Filed: Feb. 24, 1986

Related U.S. Application Data

[63] Continuation of Ser. No. 634,182, Jul. 26, 1984, abandoned, which is a continuation of Ser. No. 333,322, Dec. 22, 1981, abandoned.

[51] Int. Cl.$^4$ .................. G01B 11/20; G01B 21/32
[52] U.S. Cl. ........................ 73/762; 116/DIG. 34
[58] Field of Search ....... 116/212, 266, 270, DIG. 34; 73/761, 762, 822, 833, 834, 848, 862.23, 862.53; 285/93; 33/178 D, 179

[56] References Cited

U.S. PATENT DOCUMENTS

| | | | |
|---|---|---|---|
| 1,428,637 | 9/1922 | Hutchinson | 73/834 |
| 1,572,193 | 2/1926 | Engel | 33/179 |
| 3,314,156 | 4/1967 | Van Burkleo | 33/179 |
| 3,431,812 | 3/1969 | Dahl . | |
| 3,461,715 | 8/1969 | Stover, III . | |
| 3,469,492 | 9/1969 | Dahl . | |
| 3,474,701 | 10/1969 | Setzler . | |
| 3,546,944 | 12/1970 | Mack | 116/266 |
| 3,889,526 | 6/1975 | Elsner et al. . | |
| 3,938,373 | 2/1976 | Fletcher | 73/833 |
| 3,945,704 | 3/1976 | Kraus et al. . | |
| 3,948,141 | 4/1976 | Shinjo . | |
| 3,964,299 | 6/1976 | Johnson . | |
| 4,125,040 | 11/1978 | True . | |
| 4,142,266 | 3/1979 | Dahl . | |
| 4,164,164 | 8/1979 | Trungold . | |
| 4,182,189 | 1/1980 | Dock et al. . | |
| 4,226,127 | 10/1980 | Hardiman . | |

*Primary Examiner*—Charles Frankfort
*Assistant Examiner*—W. Morris Worth
*Attorney, Agent, or Firm*—Finnegan, Henderson, Farabow, Garrett & Dunner

[57] ABSTRACT

A device for gauging hoop stress in a female threaded connector member, the stress being caused by tightening of a tapered male threaded member into the female member, including an annular body dimensioned for surrounding the female member with a firm fit therebetween, the body including two discrete complementary half-sections. Each of the half-sections includes an overlapping segment on one end, and each segment has an aperture therein. A pin is provided for insertion through the aligned apertures. An anchor block is fixed to each of the otherwise free ends of the annular body, each of the blocks having a cutout portion therein. A weak link having a tensile strength less than that of the annular body is provided for insertion into the cutout portions for joining the blocks. The weak link clamps the body about the female member and breaks under the application of a predetermined hoop stress to the female member.

11 Claims, 10 Drawing Figures

FIG. 1
FIG. 6
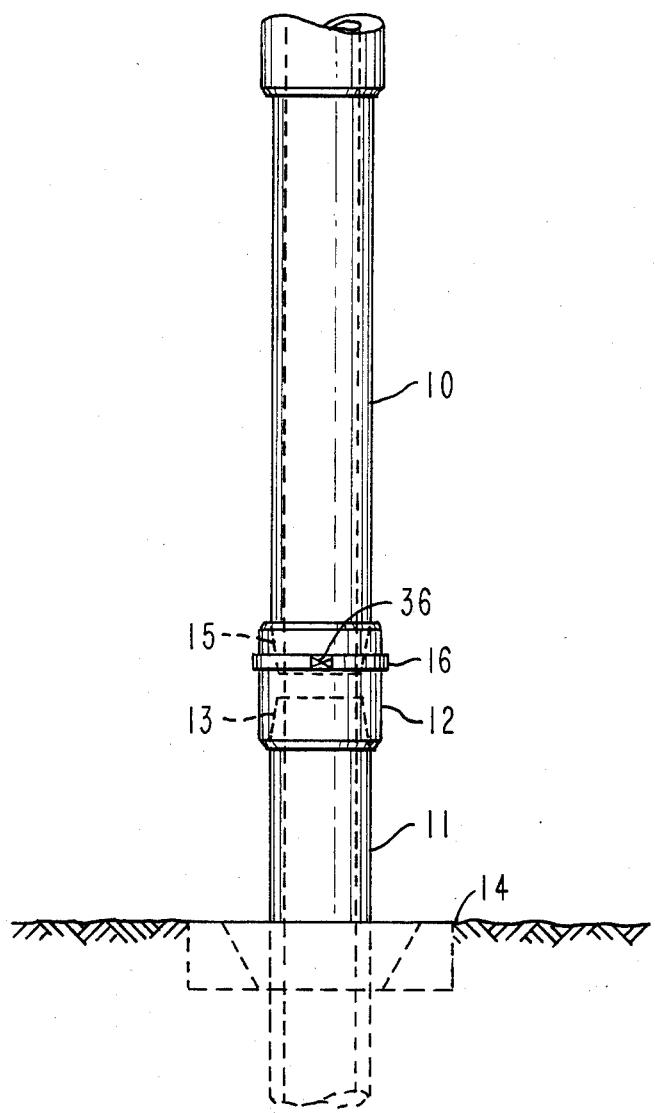
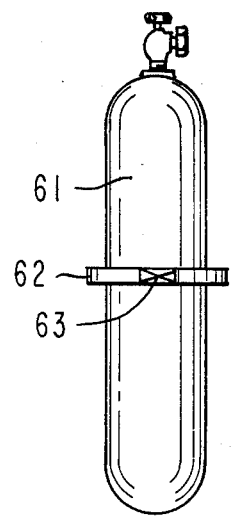

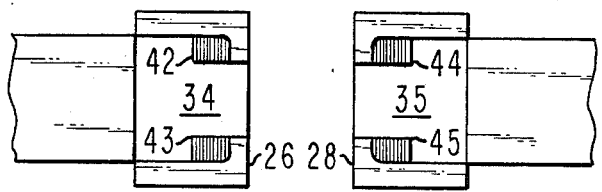
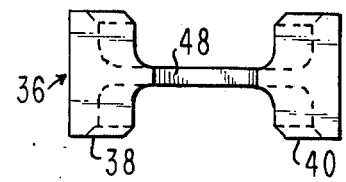
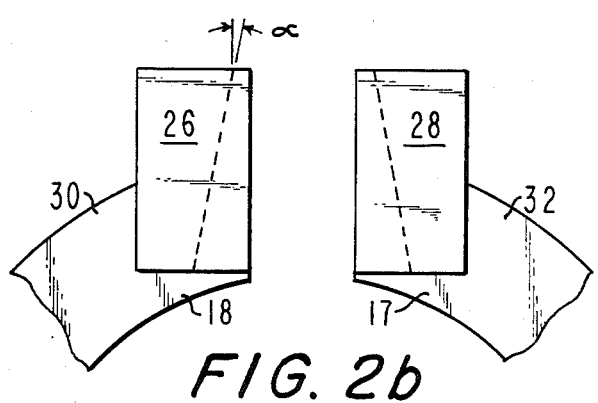
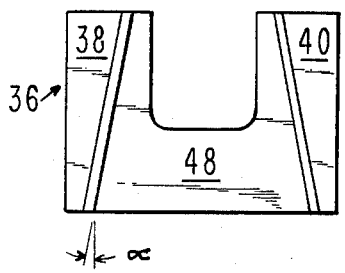
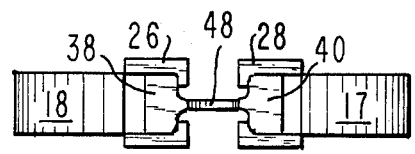
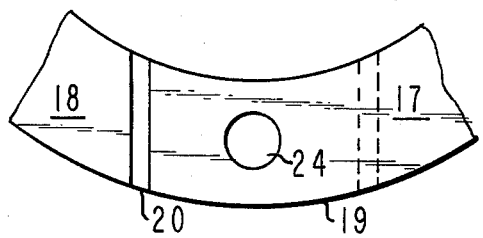
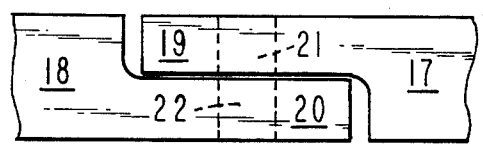
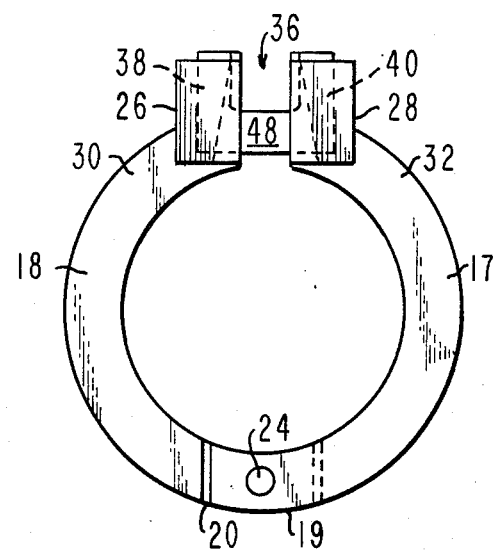

STRESS GAUGING DEVICE FOR THREADED CONNECTOR

This application is a continuation, of application Ser. No. 634,182 filed July 26, 1984; now abandoned, which is a continuation of Ser. No. 333,322 filed Dec. 22, 1981 now abandoned.

FIELD OF THE INVENTION

This invention relates generally to devices for gauging the engaging stress of threaded connectors, particularly to such devices giving a signal when proper engaging stress has been reached.

BACKGROUND OF THE INVENTION

Over the years, one of the most persistent problems encountered in the oil field industry has been the problem of correctly judging when a connection has been properly assembled between successive sections of drill pipe, tubing, casing or the like. Presently, such tubing, casing, and drill pipe connections are assembled on the basis of a specified torque beyond hand tightness, either in accordance with American Petroleum Institute specifications, or torque values supplied by the company whose connectors are being used. Generally, male threaded members are attached to the two sections of pipe or tubing to be joined together. The female threaded member, also called the coupling or box member, is then attached, and the connection is tightened to a hand-tight condition. In most cases, power tongs are then applied to tighten the connection until the recommended or specified torque value is reached.

If the connection is not torqued enough, insufficient radial thread interference in the connection may result in reduction of the pressure capability of the seal. This can cause leakage if the bearing pressure between the mating surfaces is less than the internal pressure encountered in the particular well.

Application of too much torque to the connection may cause either member to exceed its yield point, thereby resulting in a loss of its dimensional accuracy. When this happens, the connectors are not interchangeable and their use may create a hazard in the well.

Several apparatus have been devised for controlling the application of torque to such connections. For example, U.S. Pat. No. 4,125,040 discloses a power tong apparatus which includes an automatic shut off capability when a predetermined torque has been achieved. Additional apparatus and methods are described and referenced in that patent.

The use of torque as a measure of the proper stress level in either the male or female members of a threaded connection does not result in attainment of the actual stress level in such a connection. The relationship between torque and stress is tied to a friction factor, which cannot be accurately determined due to fluctuating variables such as the type of lubrication used on the connection, temperature, surface finish of the threads, machining tolerances, etc. Hence, torque is at best a "ball park" way of determining the proper makeup of a threaded connection. In particular, such a method does not indicate the proper makeup of the connection if the taper of the male member, also called the pin, is over tolerance, and/or the box member is under tolerance. Although the connector may meet the specified torque requirements due to a tight fit at one end of the female member, it may not hold as much pressure as it should, if the overall tolerance of the female member exceeds specified limits. In addition, overtorque can result if the recommended or specified torque value has not been accurately determined. This causes deformation of the female member and loss of interference in the connection.

The recommended torque used in actual practice is calculated using a formula derived from tests conducted under controlled laboratory conditions. If any of the variables in the formula change, then the torque requirements change. Since it is impractical to determine each variable in the field and correspondingly adjust the recommended torque, the connections are torqued to the nominal torque based on perfect conditions. In the laboratory, strain gauges may be used to relate the hoop stress to torque. However, it is not possible to separate out defects in diametrical tolerance, taper tolerance, thread crest height tolerance and lead tolerance using standard thread hardened and ground ring and plug gauges.

Most importantly, conditions approximating those in the laboratory very rarely occur in the field. If problems develop in the connectors, they are reworked in field shops or in whatever machine shop facility is available, with little or no access to appropriate gauges. This leads to incorrect tapers, gauge standoffs and other dimensional inaccuracies. Such connectors are torqued up in the field to torques that are based on nominal tapers and gauge standoffs, thereby leading to incorrect stress in the female member. Inaccurate tapers result in unpredictable radial thread interference which may cause a loss of pressure containment of the assembled connection. In drill pipe, abnormal hoop stress can cause failure due to fatigue.

At the present time there is no practical way to determine hoop stress at the outer diameter of a female connector member in the field. Strain gauges and torque formulas may be useful in the laboratory, but have proven unworkable in field use. When a failure occurs, a field engineer may advise on the use of more or less torque to prepare the connection. However, the failure which resulted in adjustment of the torque may have already resulted in delays in the project, and additional expenses.

Accordingly, it is a primary object of this invention to properly gauge the hoop stress in a female threaded connector member caused by tightening of a tapered male threaded member into the female member.

It is a further object of this invention to detect undesirable tapers in the threads of a male or female threaded connector member in the field.

Another object of the invention is to provide a threaded connection which will have the lowest possible stress at the maximum sealing integrity.

Additional objects and advantages of the invention will be set forth in part in the description that follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects and in accordance with the purpose of the invention, as embodied and broadly described herein, the hoop stress gauge of this invention comprises an annular body dimensioned for surrounding a female threaded connector member with a firm fit therebetween, the body including two discrete complementary half sections; pivot means for joining the half sections at one end thereof; and weak link means for rigidly joining the half sections at the otherwise free ends thereof for clamping the body about the female member, the weak link means having a tensile strength less than that of the body for breaking under the application of a predetermined hoop stress of the female member.

Preferably, the weak link means includes a pair of anchor blocks, one of the blocks being fixed to each of the otherwise free ends, each of the blocks having a cutout portion therein; and a weak link for insertion into the cutout portions for joining the blocks. Each of the blocks is preferably shaped generally as a parallelepiped and preferably extends radially outwardly from a corresponding free end of one of the half sections, one of the cutout portions extending radially through each of the blocks.

It is also preferred that the cutout portions and the weak link be configured for clamping the weak link against the female member.

Preferably, each of the half sections includes an overlapping segment on the one end, each segment having an aperture therein, and the pivot means includes a pin for insertion through the aligned apertures. The weak link may have a tapered longitudinal cross section, with the cutout portions correspondingly tapered for receiving the weak link.

The invention also comprises a method for detecting pressure buildup in a hollow vessel beyond a specified level. In accordance with the invention, the method comprises the steps of surrounding the vessel with an annular body having a weak portion of predetermined tensile strength with a firm fit therebetween; and monitoring the condition of the weak portion for indicating when the level is approached.

In addition, the invention includes a method of detecting a dimensional inaccuracy in a threaded connection having male and female threaded members. The method comprises the steps of surrounding the female member with an annular body having a weak portion of predetermined tensile strength with a firm fit therebetween; applying a tightening force to the connection until the weak portion breaks; and determining the presence of exposed threads on the male member for signalling when the connection is improperly assembled.

BRIEF DESCRIPTION OF THE DRAWINGS

The accompanying drawings which are incorporated in and constitute a part of this specification, illustrate one embodiment of the invention, and, together with the description, serve to explain the principles of the invention.

FIG. 1 is a partial cut-away view of an assembled connection on which the stress gauging device of the invention has been installed;

FIGS. 2a and 2b are enlarged top and side views, respectively, of the anchor block portion of the invention;

FIGS. 3a and 3b are top and side views, respectively, of the weak link of the invention;

FIGS. 4a and 4b are top and side views, respectively, of the pivot means of the invention;

FIGS. 5a and 5b are top and side views, respectively, of the stress gauging device of the invention, with the weak link inserted; and FIG. 6 is a side view of an arrangement where the stress gauging device of the invention is applied to a pressure vessel.

DESCRIPTION OF THE PREFERRED EMBODIMENT

Reference will now be made in detail to the present preferred embodiment of the invention, an example of which is illustrated in the accompanying drawings.

As shown in FIGS. 1 and 5b, the invention is a device for gauging hoop stress in a female threaded connector member, the stress being caused by tightening of a tapered male threaded member into the female member. In accordance with the invention, an annular body is dimensioned for surrounding the female member with a firm fit therebetween, the body including two discrete complementary half sections. In the illustrated embodiment, two sections of production tubing 10 and 11 are shown being joined by a standard coupling 12. The lower section of tubing 11 extends from the floor of the drilling rig 14, and has a male threaded member 13 on the upper end thereof. A similar male threaded member 15 is attached to the lower end of the tube 10. An annular body 16 is dimensioned for surrounding the female member with a firm fit therebetween. The body 16 includes two discrete complementary half sections 17 and 18 as shown in FIG. 5b. The annular body may be formed of steel, aluminum, or any other suitable material. As best shown in FIG. 4b, each of the half sections 17 and 18 includes an overlapping portion 19 and 20 at one end thereof. The segment 19 has an aperture 21 therethrough and the segment 20 has an aperture 22 extending therethrough.

In accordance with the invention, pivot means are provided for joining the half sections at one end thereof. As embodied herein, and as best shown in FIGS. 4a and 4b, the pivot means includes a pin 24 for insertion through the aligned apertures 21 and 22. This structure allows the half sections 17 and 18 to open and close with a hinge-type action. Other types of pivot mechanisms known to those skilled in the pivot art may be used.

In accordance with the invention, weak link means are provided for rigidly joining the half sections at the otherwise free ends thereof for clamping the body about the female member. The weak link means has a portion with a tensile strength less than that of the body for breaking under the application of a predetermined hoop stress to the female member. Preferably, the weak link means includes a pair of anchor blocks 26 and 28, one of the blocks being fixed to each of the otherwise free ends, each of the blocks having a cutout portion therein; and a weak link for insertion into the cutout portions for joining the blocks. The block 26 is fixed to the end 30 of half section 18. Similarly, the block 28 is fixed to the end 32 of half section 17. The blocks may be rigidly attached, for example, by welding, or they may be integrally formed with the half sections 17 and 18.

As shown in FIG. 2a, each of the blocks 26 and 28 has a cutout portion 34 and 35, respectively, extending radially therethrough. As shown in FIGS. 3a and 3b, a weak link 36 is provided for insertion into the cut out portions 34 and 35 for joining the blocks 26 and 28. The opposite ends of the weak link 36 preferably have a tapered configuration as shown in FIG. 3b. The cutout portions 34 and 35 are correspondingly tapered for receiving the weak link 36. As shown in FIGS. 3a and 3b, the weak link 36 is U-shaped over its longer cross-section, and generally resembles a bar-bell shape over the opposite cross-section. The respective ends of the bar-bell 38 and 40 are held in place in the cutout portions 34 and 35 by the combined action of the taper, and the internal angular faces 42, 43, 44 and 45 of the cutout portions 34 and 35.

Due to different size connectors the weak link cross-section may vary in shape and size, and the weak portion may be moved from the middle to the sides of the weak link for design purposes. Also the cross-sectional area may vary from connection to connection.

The weak link also includes a failure area 48 which is narrower than the remaining portion of the weak link 36. The hoop stress on the ring body 16 is concentrated in the failure area 48, thereby insuring that the weak link 36 will be the breaking point when hoop stress is applied to the ring body 16. The weak link is specifically designed to break at the required stress for the particular connector being used. It may be formed of any suitable material with the necessary tensile properties, but plastic is preferred for economic reasons. The geometry of the failure area may also vary for monitoring long elongations or short elongations.

The taper $\alpha°$, as shown in FIGS. 2b and 3b is dimensioned from a vertical reference plane, and machined on the height of each block 26 and 28. This taper produces a clamping force for holding the ring body 16 on the female member 12. The cutout portions 34 and 35 may also have other geometric surfaces such as a rough round surface to help insure clamping integrity and easier installation. The necessary radial force to produce such an axial clamping force is provided by simply manually pushing the weak link 36 into the cutout portions 34 and 35 in the ring body 16. When inserted, the weak link 36 closes the ring body 16 down on the female member 12, serving as a latching mechanism.

In operation, the stress ring serves as a means of signaling that the desired hoop stress has been reached using a predetermined expansion point. When the ring body 16 is properly installed, preferably over the area of the female connector 12 where the male member will exert the most thread interference, it will react with hoop stress, consistently signalling the desired stress point by breaking as the female member 12 and the ring body 16 expand together in a unique direct stress relationship.

The ring 16 eliminates the torque formula and the inaccuracies accompanying its use. It relies solely on its direct interaction with the expansion of the female member outside diameter, the most precise indicator of hoop stress. Thus, the ring 16 will reliably signal the recommended hoop stress, both in field and laboratory settings.

Using the ring has the added benefit of alleviating problems associated with the normally corrosive environment to which oil pipe is subjected. The corrosion factor mandates that connections be made up at the lowest possible stress consonant with sealing integrity. By calculating a proper hoop stress value, the ring can be used to signal recommended hoop stress where the lowest possible stress with sealing integrity equivalent to that of the pipe body has been reached.

The ring also detects variables affecting hoop stress which are not even considered by the torque formula. One example is radial stress which could create hoop stress at the outer surface of the female member, due to radial thread interference, before the connection shoulder is loaded on drill pipe or collars. This would create a high stress level at the female member outside diameter because part of the recommended torque goes into the threads rather than the shoulder.

Normally, after a connection is properly assembled, no threads are visible on the male threaded member. When using a torque formula to tighten such connections, the connection is tightened by a specified number of turns, and the required torque to accomplish such tightening is measured. If a dimensional inaccuracy is present in the male or female member, such as an undesirable taper or inaccurate thread, the assembled connection may still appear to be proper with no male threads exposed. The torque reading may also be within the recommended range, because of torque which was used in overcoming the dimensional inaccuracy. However, the resulting connection may have a low sealing integrity and may be subject to premature failure. Many such connections presently go undetected because the torque formula does not allow for monitoring of the stress in the connection as it is being tightened.

By using the stress gauging device of the invention, an unduly high stress caused by dimensional inaccuracy in either the male or female member will cause the weak link to break. The application of tightening force can be discontinued immediately upon breakage of the weak link. If exposed threads are thereafter observed on the male member, both connectors can be replaced, and an improper connection can be avoided.

It should be noted that the stress ring body can be reused repeatedly. As the weak link breaks, the assembly drops to the rig floor. Another weak link may be installed in the same ring body, creating a new assembly. The stress ring is a simple and direct method of enabling field crews to make up strings at proper hoop stress by signalling accurately and reliably when a predetermined stress point has been reached. The use of this stress ring eliminates any need for torque measuring equipment. By knowing the elongation of the material, and the amount the female member should expand due to interference, the proper dimensions of the weak link may be determined. The unique design of the weak link cross-sectional area results in failure at as small an amount of stress as possible. This keeps the material cost to a minimum. In addition, since the weak link is the only part of the body 16 which fails, no large pieces of broken metal or other objects are propelled outward, and there is a reduced danger of injury from large flying objects.

Thus, the invention provides a practical and useful device which may be economically manufactured and which meets a critically important need in the industry. While the preferred embodiment described is particularly used in the oil field industry, the invention may be used with any threaded connector which expands as a result of hoop stress or radial force as the connection is tightened. In particular, it may be used to detect stress in pressure vessels and valves or the like, in a manner similar to that described above. The ring signals the presence of undue expansion and stress in such structures by breaking at a predetermined stress point before the vessel or valve reaches its failure or breaking point. A typical arrangement of such a vessel is shown in FIG. 6 where 61 is a pressure vessel, 62 is the stress ring mounted about the vessel, and 63 designates the weak link.

It will be apparent to those skilled in the art that various modifications and variations could be made in the invention without departing from the scope or spirit of the invention.

What is claimed is:

1. A device for signaling the attainment of maximum allowable hoop stress in a female threaded connector member, said stress being caused by tightening of a tapered male threaded member into said female member, comprising:
   an annular body dimensioned for surrounding said female member with a firm fit therebetween, said body including two discrete complementary half sections;
   pivot means for joining said half sections at one end thereof;
   weak link means for rigidly joining said half sections at the otherwise free ends thereof for clamping said body firmly about said female member, said weak link means having a portion with a tensile strength less than that of said body for breaking under the application of a predetermined maximum allowable hoop stress to said female member; and
   attachment means for firmly adjoining the weak link means between the half sections and permitting ready replacement of the weak link means for subsequent re-use of the device.

2. The device of claim 1 wherein said attachment means includes a pair of anchor blocks, one of said blocks being fixed to each of said otherwise free ends, each of said blocks having a cutout portion therein,
   said weak link means including said lower tensile strength portion being insertable into said cutout portions for joining said blocks.

3. The device of claim 2 wherein each of said blocks is shaped generally as a parallelepiped and extends radially outward from a corresponding free end of one of said half sections, said cutout portions extending radially through each of said blocks.

4. The device of claim 3 wherein said cutout portions and said half sections are configured for clamping said weak link means against said female member after said weak link means has been inserted.

5. The device of claim 4 wherein each of half sections includes an overlapping segment on said one end, each said segment having an aperture therein; and said pivot means includes a pin for insertion through said apertures.

6. The device of claim 5 wherein said female member is a drill pipe box member, and said male member is attached to a corresponding section of drill pipe.

7. The device of claim 6 wherein said weak link means is plastic.

8. The device of claim 4 wherein opposite ends of said weak link means have a tapered configuration and said cutout portions are correspondingly tapered for receiving said opposite ends of said weak link means.

9. The device of claim 8 wherein one cross-section of said weak link means is generally barbell-shaped, and the orthogonal cross-section is generally U-shaped.

10. A device for signaling the attainment of maximum allowable hoop stress in a hollow vessel, said stress being caused by pressure within said hollow vessel, comprising:
    an annular body dimensioned for surrounding said vessel with a firm fit therebetween, said body including two discrete complementary half sections;
    pivot means for joining said half sections at one end thereof;
    weak link means for rigidly joining said half sections at the otherwise free ends thereof for clamping said body about said vessel, said weak link means having a portion with a tensile strength less than that of said body for breaking under the application of a predetermined maximum allowable hoop stress to said vessel; and
    attachment means for adjoining the weak link means between the half sections and permitting ready replacement of the weak link means for subsequent re-use of the device.

11. A method of assembling a threaded connection having male and female threaded members for achieving a predetermined hoop stress in said female member comprising the steps of:
    surrounding the female member with an annular body having two pivoted half sections;
    assembling a weak portion of predetermined tensile strength corresponding to said predetermined hoop stress to attachment means on the half sections thereby forming a firm fit between the female member and the body; and
    applying a tightening force to the connection until said body breaks.

* * * * *